(12) United States Patent
Dunn et al.

(10) Patent No.: US 10,782,262 B2
(45) Date of Patent: Sep. 22, 2020

(54) NON-DESTRUCTIVE, LOCALIZED HEAT TREATMENT DEVICE CAPABLE OF ATTACHMENT TO NON-PLANAR SURFACES

(71) Applicant: ElectraWatch, Inc., Charlottesville, VA (US)

(72) Inventors: Ryan C. Dunn, Charlottesville, VA (US); Donald A. Tubbs, Charlottesville, VA (US)

(73) Assignee: ElectraWatch, Inc., Charlottesville, VA (US)

( * ) Notice: Subject to any disclaimer, the term of this patent is extended or adjusted under 35 U.S.C. 154(b) by 445 days.

(21) Appl. No.: 15/646,047

(22) Filed: Jul. 10, 2017

(65) Prior Publication Data

US 2018/0011050 A1    Jan. 11, 2018

Related U.S. Application Data

(60) Provisional application No. 62/360,372, filed on Jul. 9, 2016.

(51) Int. Cl.
| | | |
|---|---|---|
| *G01N 27/406* | (2006.01) | |
| *G01N 27/416* | (2006.01) | |
| *G01N 27/90* | (2006.01) | |
| *G01N 17/02* | (2006.01) | |
| *B25B 11/00* | (2006.01) | |

(52) U.S. Cl.
CPC ........ *G01N 27/4067* (2013.01); *B25B 11/005* (2013.01); *B25B 11/007* (2013.01); *G01N 17/02* (2013.01); *G01N 27/416* (2013.01); *G01N 27/9053* (2013.01)

(58) Field of Classification Search
CPC ......... H01L 21/67109; H01L 21/67098; H01L 21/67103; H01L 21/67115; H01L 21/67248; H01J 37/32724; H01J 37/32733; H01J 37/32743; H01J 37/32761; H01J 37/3277; H01J 37/32779; G01N 27/4067; G01N 27/416; G01N 27/9053; G01N 17/02; B25B 11/005; B25B 11/007
See application file for complete search history.

(56) References Cited

U.S. PATENT DOCUMENTS 7,156,924 B2 *   1/2007   Renken ............. H01L 21/67109
                                                        118/724

* cited by examiner

*Primary Examiner* — Shawntina T Fuqua
(74) *Attorney, Agent, or Firm* — Paul A. Bell (57) ABSTRACT

An apparatus comprising a heating unit and a support device is disclosed which apparatus is designed to place a controlled amount of heat into a very localized area of a substrate of interest. The substrate of interest here is intended to be a portion of a large structure [such as the portion of a ship]. The heating unit comprises a heat source and the necessary structure to closely control the heat applied to the substrate of interest. The support device supports the heating unit directly over the substrate of interest and permits the system to be secured to one surface of the substrate of interest in a removable and non-destructive manner. The support device has legs which have securing means on the bottom thereof to secure the system to one surface of the substrate of interest in a releasable and non-destructible way.

17 Claims, 7 Drawing Sheets

NON-DESTRUCTIVE, LOCALIZED HEAT TREATMENT DEVICE CAPABLE OF ATTACHMENT TO NON-PLANAR SURFACES

CROSS-REFERENCE TO RELATED APPLICATIONS

This application claims the benefit under 35 U.S.C. 119(e) of commonly owned prior U.S. application 62/360,372 filed on 9 Jul. 2016. The support device of this invention is similar to the support device in applicant's U.S. application Ser. No. 13/522,524 filed on 24 Jan. 2011 as PCT/US2011/022286 [now U.S. Pat. No. 9,599,588] and Ser. No. 13/561,032 filed on 28 Jul. 2012. Applicants hereby incorporate by reference the disclosure of U.S. Pat. No. 9,599,588 and U.S. published application 2013/0186756 A1 which is the published patent application corresponding to U.S. application Ser. No. 13/561,032.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The invention is an apparatus which will permit closely controlled heat treatment to the surface of a substrate of indefinite size [hereinafter the substrate of interest].

Description of Related Art Including Information Disclosed Under 37 CFR 1.97 and 1.98

Not Applicable.

BRIEF SUMMARY OF THE INVENTION

The apparatus comprises a heating unit and a support device. The heating unit is designed to place a controlled amount of heat into a very localized area. The heating unit is designed with a support device that permits a closely controlled heat treatment to be applied to the surface of a substrate of interest. The substrate of interest here is intended to be a portion of a large structure [such as a portion of a ship]. The heating unit comprises a heat source and the necessary structure to closely control the heat applied to the substrate of interest. The support device supports the heating unit directly over the substrate of interest and permits the system to be secured to one surface of the substrate of interest in a removable and non-destructive manner. The support device has legs which have securing means on the bottom thereof to secure the system to one surface of the substrate of interest in a releasable and non-destructible way. Normally the support device will have at least three (3) legs [although there may be more or less as desired and/or necessary]. Typically, these securing means comprise a powerful suction cup, but they may be magnetic if the substrate of interest is ferrous or they could be any other suitable means to secure the device to a substrate of interest in a releasable and non-destructible way. The support device also permits the heating unit to be biased towards the substrate of interest. Removable, as used herein, means that the system may be placed upon a surface of the substrate of interest and then removed. The idea is that the legs permit the device to be secured to and removed from a substrate of interest in a manner that does not damage the substrate of interest. It is to be understood that not damaging the substrate of interest may still permit a cleaning or light abrasion of the substrate of interest to remove a protective coating in the area where the treatment is desired.

The support device may also have an adjustment means that permits each leg to independently extend/retract as necessary to accommodate an irregular[non-planar] surface. The legs permit the device to be biased against the surface and the design of the heater assures that the surface directly under the heater will receive the correct treatment and the area even immediately outside the heater will receive minimal heat. In certain applications the heating unit will be sealed against said surface.

The substrate of interest will most often be a metal, often aluminum, and may have an irregular surface. To provide the best contact possible with such an irregular substrate, each leg of the device is independently adjustable [as noted above] in order to move the heater body closer or farther away from the substrate surface. Each leg has a two stage adjustment system, a coarse adjustment and a fine adjustment. As mentioned above, the support device comprises means to secure the device to the substrate of interest and permits the device to be biased against the substrate. This feature, in combination with the above mentioned independently adjustable legs permits the device to be used on substrates with irregular surfaces. If the means to adhere is a suction cup, it is even possible to removably secure the device to a vertical surface using vacuum-powered suction cups. These are suction cups powered by air being forced through a vacuum producing venturi closely associated with the suction cup. Using this type of design, it has been found that the device can be used successfully on substrates that actually are inclined slightly beyond the vertical.

DETAILED DESCRIPTION OF THE INVENTION

Figure 1:
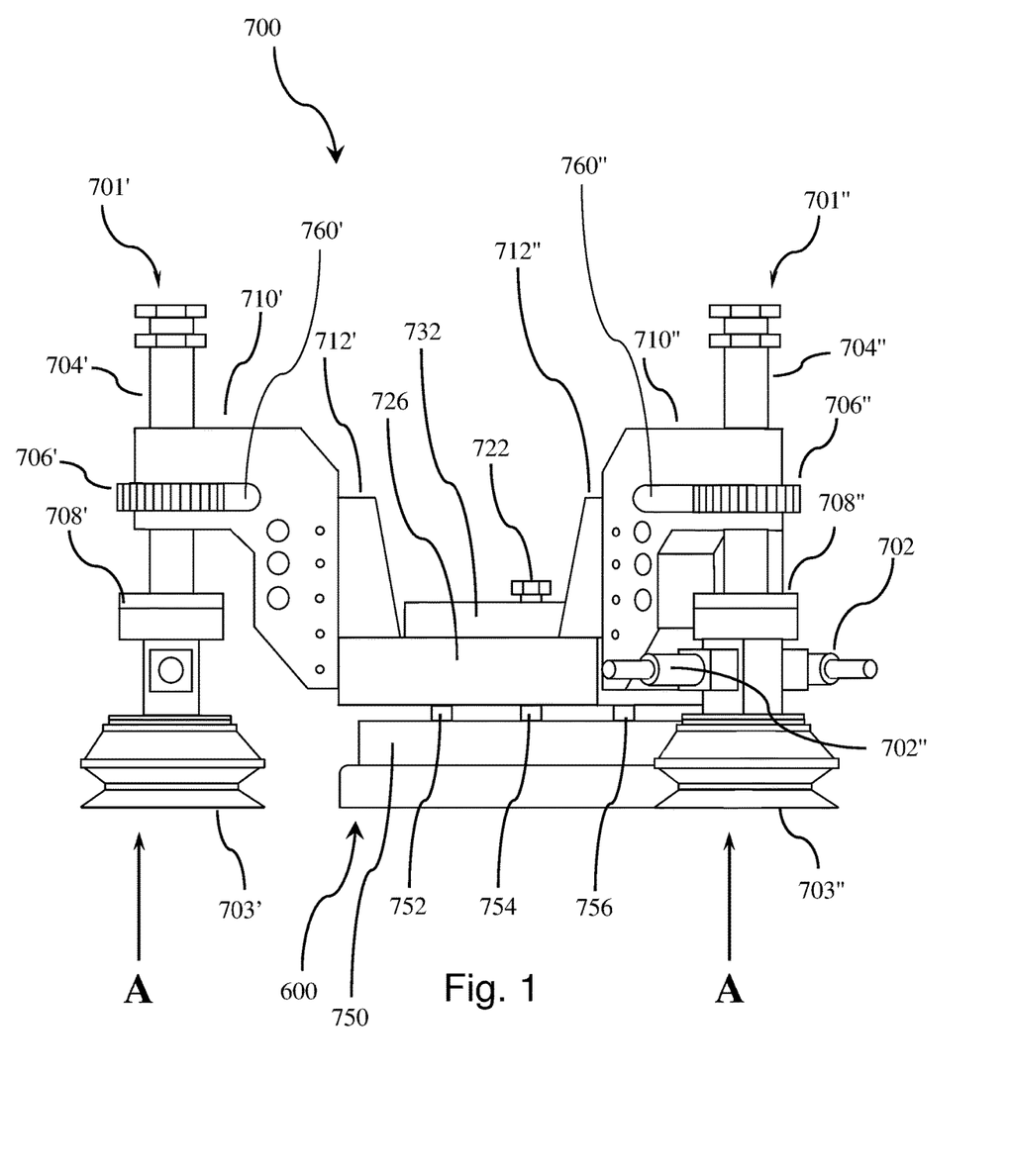
FIG. 1 shows a side elevation of a first embodiment of the invention.
Figure 2:
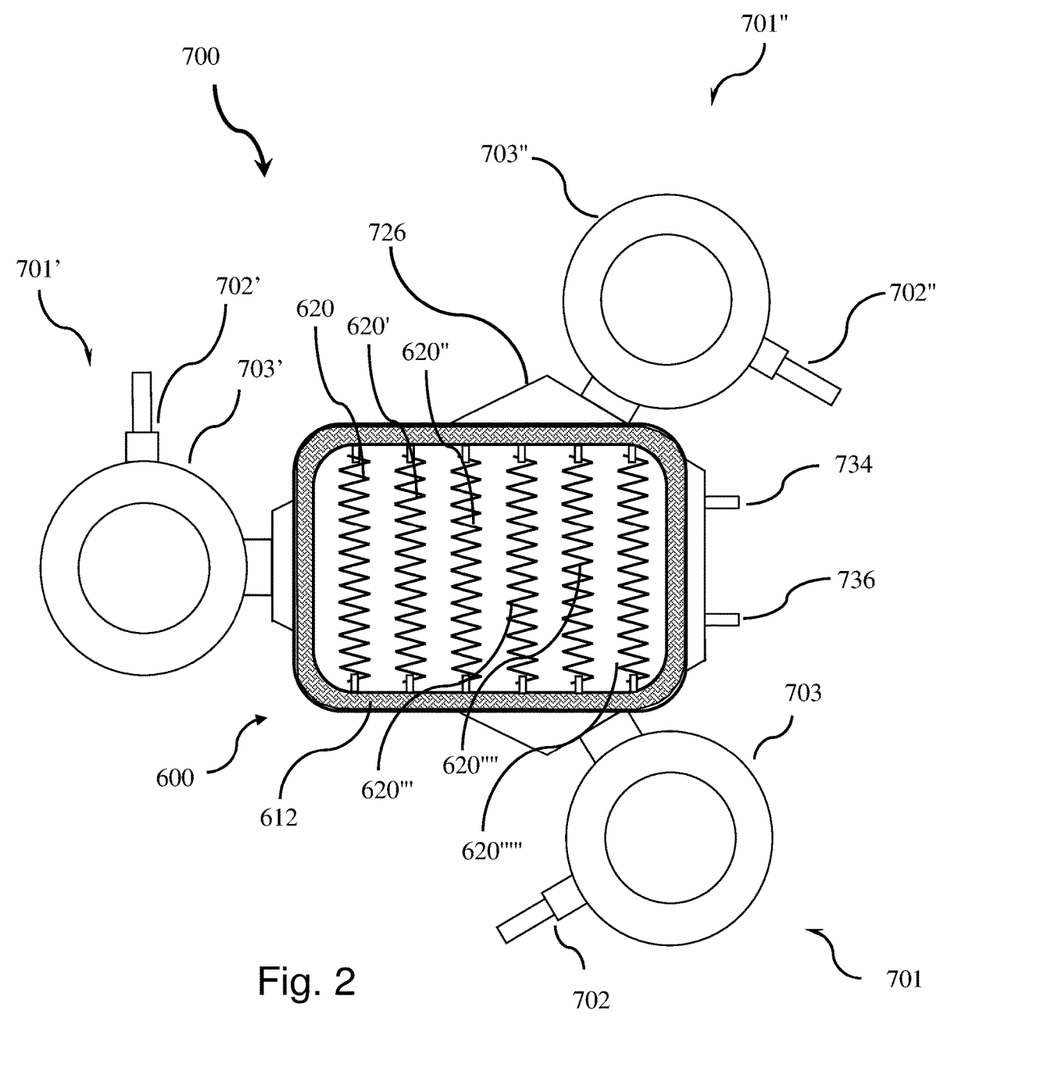
FIG. 2 shows a bottom view of the device from the perspective of arrows A in FIG. 1.
Figure 3:
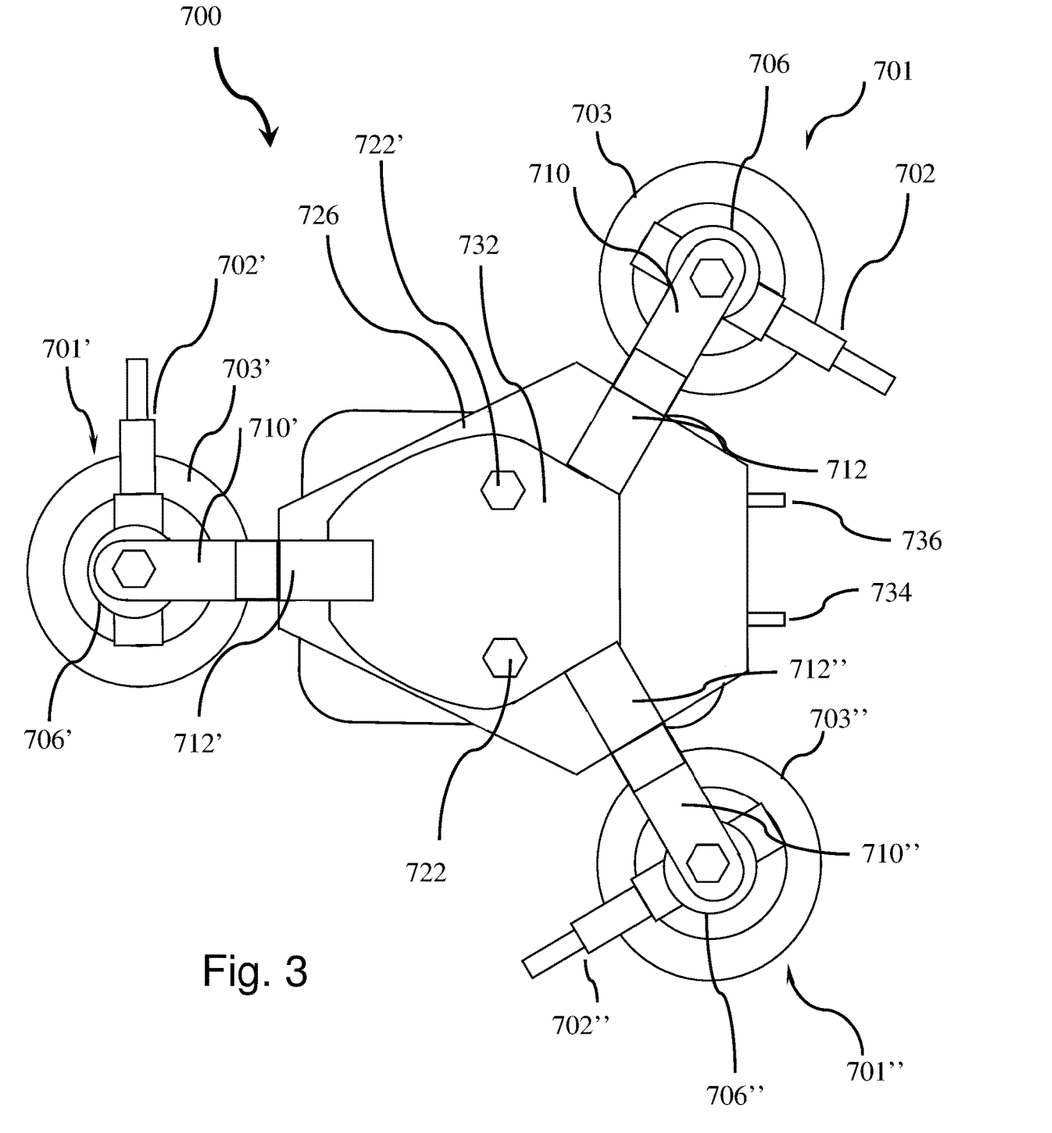
FIG. 3 shows a top or plan view of the device of FIG. 1.

FIGS. 1-3 show a first embodiment of the invention. The structure of device 700 permits accurate temperature control of the local substrate area immediately under the device. Device 700 also has an attachment means which permits the device to be secured to substrates of interest with a somewhat irregular surface morphology. It is noted that device 700 is adapted to work on horizontal surfaces, sloped surfaces, vertical surfaces, and even on surfaces that are slightly beyond vertical. It is to be understood that the means used to attach the devices of FIGS. 1-7 to a substrate of interest are shown as suction cups. However, if the substrate of interest is ferrous, magnetic means could be used in place of suction cups. It is also possible to use a releasable adhesive means to mount the devices of FIGS. 1-7 to a substrate of interest.

FIG. 1 shows a side view of device 700 while FIG. 2 shows a bottom view of the device and FIG. 3 shows a top or plan view of device 700. These figures will be described together as they are different views of the same device with some common components hidden in one view but visible in the other.

Device 700 comprises a base 726 which is shown with the shape of an irregular hexagon. Obviously, other shapes than an irregular hexagon could be used, as desired and/or necessary. Base cover 732 is mounted to the upper portion of base 726. Also mounted to base 726 are leg base mounts 712, 712' and 712". These leg base mounts provide the mounting means for the suction cup assemblies 701, 701' and 701". Heater mount 750 is mounted to the lower portion of base 726 by multiple dowels which are fixed to base 726 and slidably secured in heater mount 750. Three of these dowels 752, 754 and 756 are shown in FIG. 1. This permits the heater mount 750 to slide towards and away from base 726 in a controlled manner while keeping heater mount 750 generally parallel to base 726. The motion of heater mount 750 is controlled by screws 722 and 722' which are rotatably fixed in heater mount 750 and threaded in base 726 such that rotation of screws 722 and 722' moves heater mount 750 away from or towards the lower portion of base 726. Heating unit 600 is affixed to the lower portion of heater mount 750. Thus, movement of heater mount 750 towards or away from base 726 causes heating unit 600 to move towards or away from base 726.

Each suction cup assembly comprises a large bellows-type pneumatic suction cup 703, 703' and 703" with a coaxial venturi 702, 702' and 702" mounted to the upper portion thereof. Venturi mount assemblies 708 [not shown in the drawings], 708' and 708" attach coaxial venturis 702, 702' and 702" to adjustment screws 704 [not shown in the drawings], 704' and 704". Elongated, threaded adjustment screws 704, 704' and 704" are loosely carried in a through-bore [not shown in the drawings] which runs vertically through adjustment screw mounts 710, 710' and 710". Adjustment screw mounts 710, 710' and 710"—as can be seen from FIG. 1—are generally shaped as an inverted "L" with the inverted, vertical leg of the "L" mounted to leg base mounts 712, 712' and 712", respectively. Each adjustment screw mount has a transverse slot 760 [not shown in the drawings], 760' and 760" in the horizontal portion of the U. Adjustment nuts 706, 706' and 706" which are threaded onto elongated, threaded adjustment screws 704, 704' and 704", respectively, are captured within transverse slots 760 [not shown in the drawings], 760' and 760" to permit fine height adjustment of adjustment screws 704, 704' and 704" with respect to the adjustment screw mounts 710, 710' and 710". This happens because adjustment nuts 706, 706' and 706" are threaded onto adjustment screws 704, 704' and 704", respectively, and thus have only limited horizontal movement in the plane of transverse slots 760 [not shown in the drawings], 760' and 760". The top and bottom of transverse slots 760, 760' and 760" restrain adjustment nuts 706, 706' and 706" in the vertical direction such that rotation of an adjustment nut in one direction will move the adjustment screw it is threaded onto up [or down] with respect to transverse slots 760, 760' and 760" while rotation of the same adjustment nut in the other direction will cause said adjustment screw to move in the opposite direction to the first movement. In this manner the device can be raised away from a substrate of interest or lowered toward a substrate of interest. Because the motion is controlled by the threaded connection between adjustment screws 704, 704' and 704" and adjustment nuts 706, 706' and 706", the device movement is slow and this connection provides a fine height adjustment means. It is noted that each adjustment screw 704, 704' and 704" can be independently adjusted for height.

Adjustment screw mounts 710, 710' and 710" are attached to base 726 by leg base mounts 712, 712' and 712". The means attaching the adjustment screw mounts to the leg base mounts permits a coarse height adjustment of adjustment screw mounts 710, 710' and 710" with respect to the leg base mounts 712, 712' and 712" as will be further described below. Electrical connections 734 and 736 are provided to furnish power to device 700 to power the heating unit 600 as described below.

The device of the invention has a means to control the temperature of the substrate of interest in the area immediately underneath the device. It is noted that the embodiments disclosed herein all use heating means to control the temperature of the local substrate area immediately beneath the device; however, it is recognized that some situations might call for a cooling means to control these temperatures.

The temperature control features of the instant invention involve the use of heating elements in thermal contact with the substrate of interest in the area directly underneath the device. The temperature control feature will be further discussed below. In addition, this embodiment requires compressed air to power the coaxial venturi assemblies 702, 702' and 702" in order to provide a vacuum in suction cup assemblies 701, 701', 701'.

Figure 4:
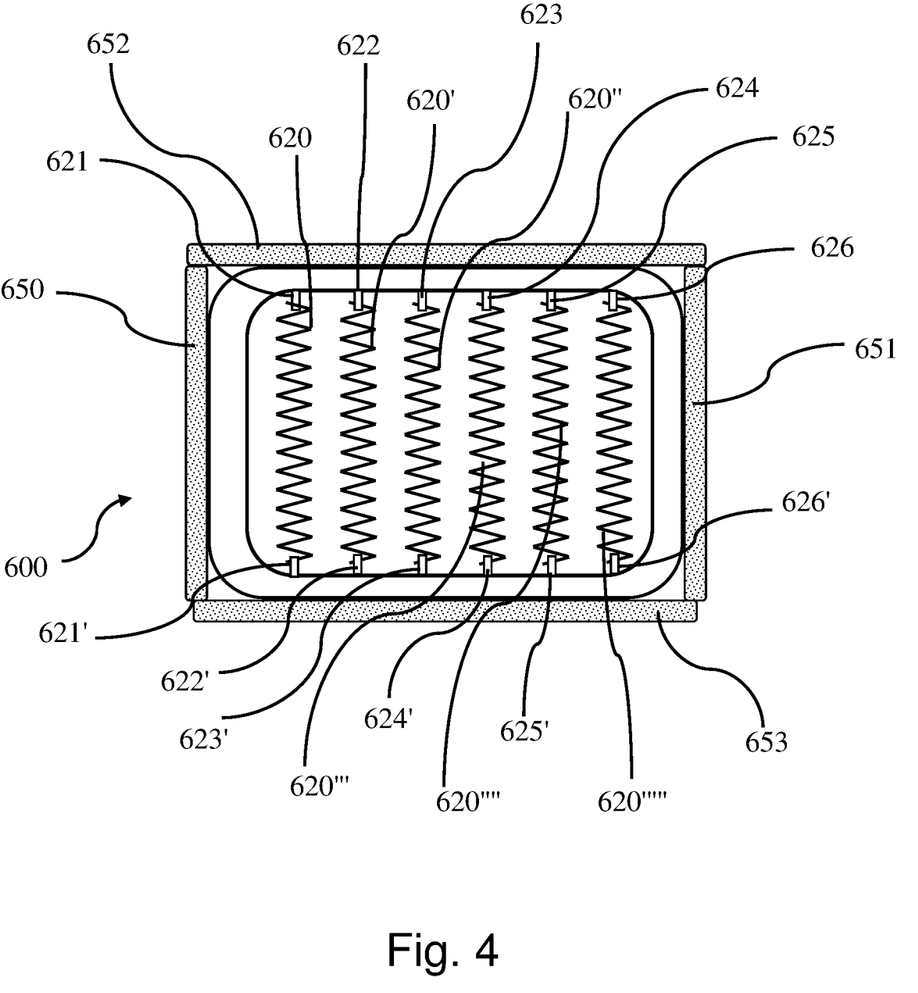
FIG. 4 illustrates the heating unit of the device of FIGS. 1-3 with heat shields attached.

The temperature control means for the substrate of interest is heating unit 600. This is shown in some detail in FIGS. 2, 4 and 5. Heating unit 600 comprises a hollow shell 601 with spaced walls 602 and 604 which hollow shell is shaped like an inverted box with an open bottom. As shown in FIGS. 2 and 4 [plan views], shell 601 has the shape of a rectangle with rounded corners. It is obvious that other geometric shapes could be used for the shape of hollow shell 601, for example, it could be square or trapezoidal [with or without rounded corners], round, oval or any other suitable shape, as desired. Filling the space between spaced walls 602 and 604 is a continuous insulation piece 612. Inside the inner wall 604 are spaced heating coils 620, 620', 620", 620''', 620'''' and 620'''''. Hex adjustment screws 722 and 722' [shown in FIGS. 1 and 3] permit the heating unit 600 to be moved towards or away from base 726. Mounting posts 621 and 621' serve to mount heating coil 620 to inner wall 604. They also provide power to heating coil 620. In like manner heating coils 620', 620'', 620''', 620'''' and 620''''' are mounted and powered by mounting posts 622, 622'; 623, 623'; 624, 624'; 625, 625' and 626, 626' respectively. Flexible heat shields 650, 651, 652 and 653 are generally rectangular pads of heat-resistant and insulative material which are designed to localize and limit the spread of heat applied by the heating coils.

Figure 5:
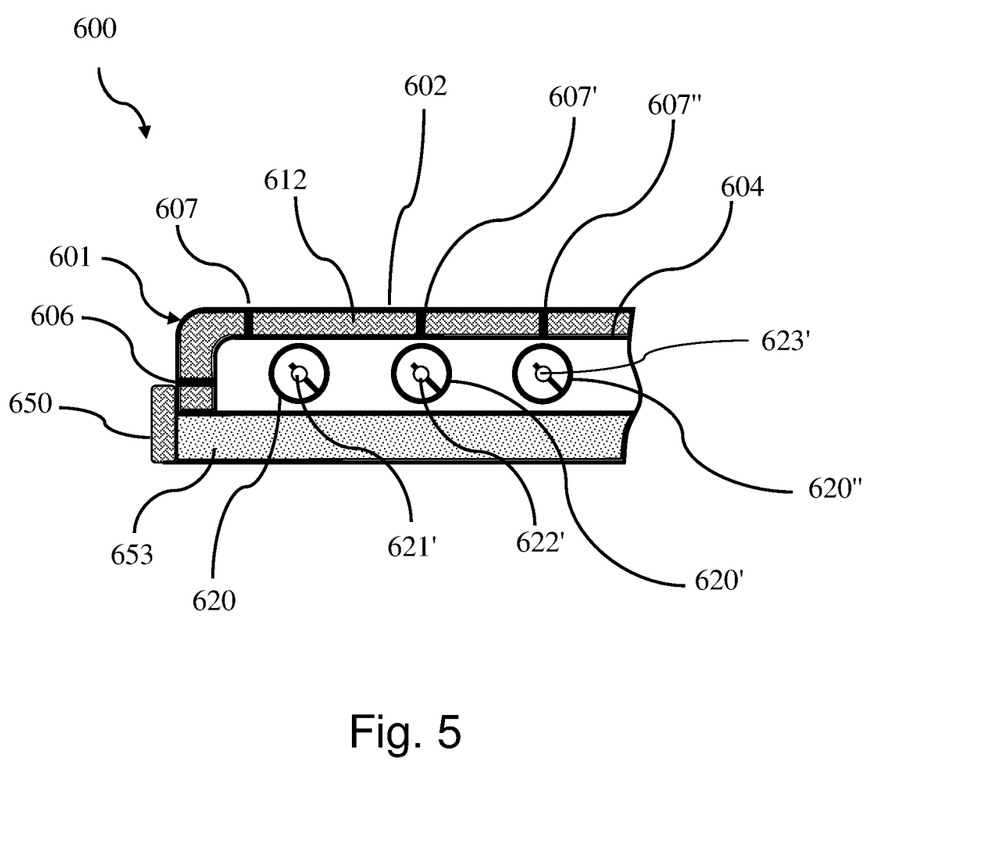
FIG. 5 shows a partial cross-section of the heating unit of FIG. 4.

A cross-section of heating unit 600 and hollow shell 601 is shown in FIG. 5. Shell 601 further comprises spaced outer wall 602 and inner wall 604 which curve over at the top and are also insulated in the top area by continuous insulation piece 612. Spacers 606, 607, 60T and 607'' are fastened to and run between outer wall 602 and inner wall 604. These spacers and others not shown in the drawings serve to maintain the distance between inner wall 602 and outer wall 604. They pass through the insulation material 612. It is obvious from the above description that thermal energy from heating coils 620, 620', 620'', 620''', 620'''' and 620''''' can escape out of the open bottom of hollow shell 601 to impinge upon the surface of a substrate of interest.

Figure 6:
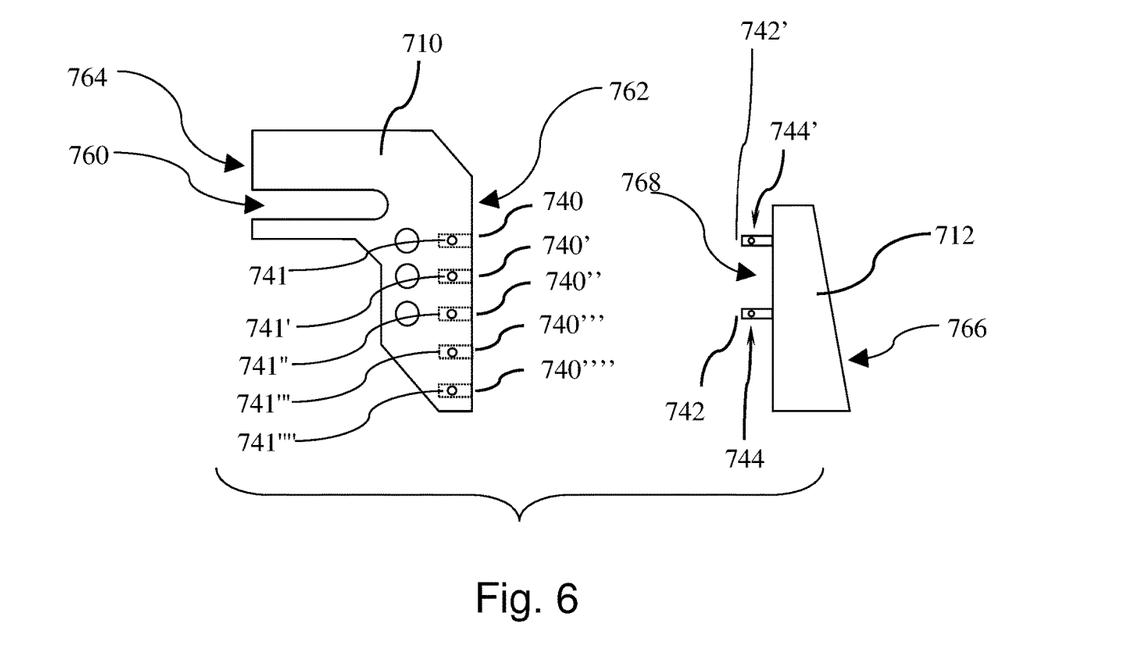
FIG. 6 illustrates the coarse height adjustment means of the embodiment of FIGS. 1-3.

FIG. 6 shows the means which attaches adjustment screw mount 710 to leg base mount 712 and provides a coarse height adjustment as discussed above. Obviously, similar means are provided to attach adjustment screw mounts 710' and 710'' to leg base mounts 712' and 712''. In FIG. 6 adjustment screw mount 710 is shown with a proximal face 762 and a distal face 764. Five linearly spaced holes 740, 740', 740'', 740''' and 740'''' of a first diameter are bored into proximal face 762 of adjustment screw mount 710 at a first pre-determined spacing. Each hole 740, 740', 740'', 740''' and 740'''' has a smaller perpendicular hole 741, 741', 741'', 741''' and 741'''' bored there-through to permit a push pin [not shown] to be inserted into the holes.

In FIG. 6 leg base mount 712 is shown with a proximal face 766 and a distal face 768. Distal face 768 has a set of linearly spaced holes [not shown] bored therein at the same spacing as the first pre-determined spacing with the holes being the same diameter as said first diameter. Pins 742, 742' are removably secured in two of the holes in distal face 768 of leg base mount 712 by pins [not shown in the drawings], threads [also not shown in the drawings] or by any other suitable means. Pins 742 and 742' have transverse bores 744 and 744' there-through. In operation, leg base mount 712 would be assembled to adjustment screw mount 710 with pins 742, 742' being inserted into corresponding holes 740 and 740'' in adjustment screw mount 710. When assembled, the perpendicular holes 741 and 741'' in adjustment screw mount 710 align with the transverse bores 744, 744' of pins 742, 742'. Push pins [not shown] are inserted through the aligned perpendicular holes and transverse bores 744, 744' to secure the assembly. In order to adjust the relative vertical position of adjustment screw mount 710 and leg base mount 712, the push pins would be removed, adjustment screw mount 710 and leg base mount 712 would be separated, and pins 742 and 742' could then be inserted into different holes, for example 740' and 740'''. This would give a different relative position between adjustment screw mount 710 and leg base mount 712. In addition, pins 742, 742' could be removed from their holes in leg base mount 712 and placed in other holes to achieve different relative positioning of adjustment screw mount 710 and leg base mount 712.

Figure 7:
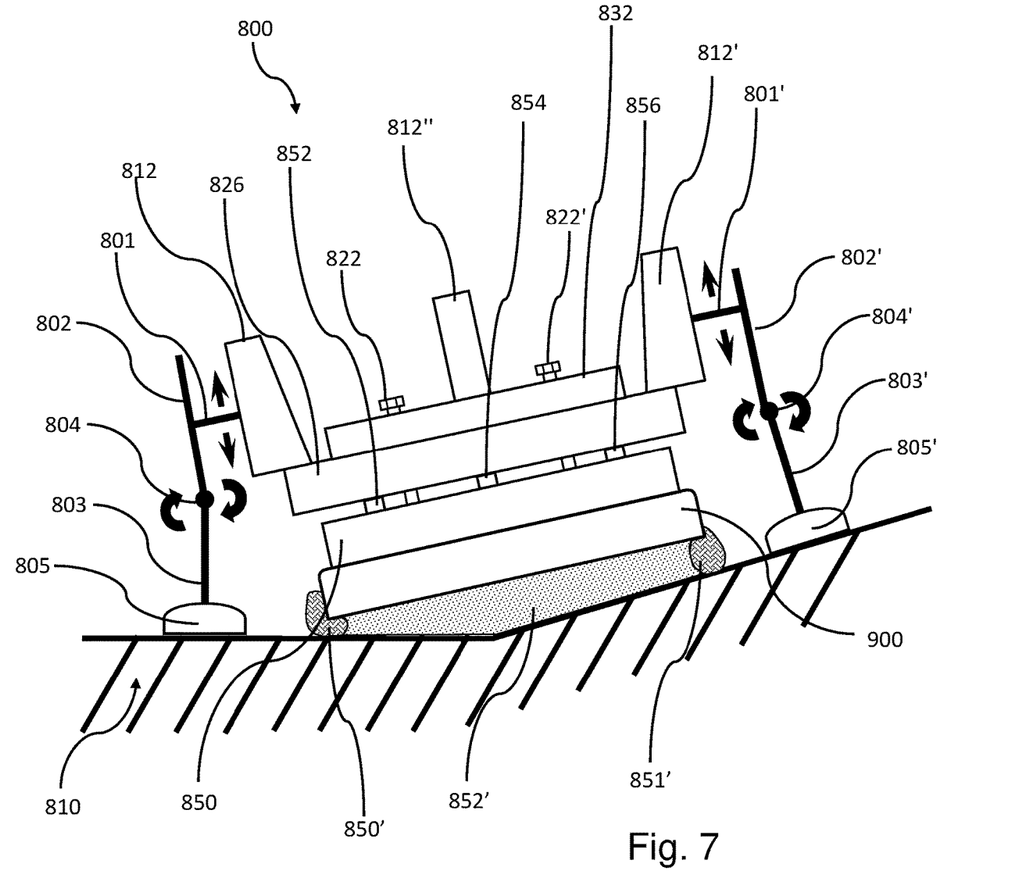
FIG. 7 illustrates a second embodiment of the invention mounted on a non-planar surface.

FIG. 7 illustrates how another embodiment 800 of the device can be used to apply heat to a non-planar surface 810. Base cover 832 is mounted to the upper portion of base 826. Also mounted to base 826 are leg base mounts 812, 812' and 812''. These leg base mounts provide the mounting means for the suction cup assemblies. The suction cup assembly and its associated mounting means with leg base mount 812'' is not shown in the drawings but is substantially similar to those of suction cup assemblies for leg base mounts 812 and 812'. Heater mount 850 is secured to the lower portion of base 826 by multiple dowels 852, 854 and 856 which are fixed to base 826 and slidably secured in heater mount 850. This permits heater mount 850 to move towards and away from the lower portion of base 826 is a controlled manner while maintaining heater mount 850 generally parallel to base 826. The motion of heater mount 850 is controlled by hex adjustment screws 822 and 822' which are rotatably fixed in heater mount 850 and threaded into base 826 such that rotation of screws 822 and 822' moves heater mount 850 away from or towards the lower portion of base 826. Heating unit 900 is attached to heater mount 850 and moves with it. Thus, movement of heater mount 850 towards or away from the lower portion of base 826 causes heating unit 900 to move towards or away from the lower portion of base 826. When the device 800 is secured to a substrate of interest, this arrangement permits the heating unit to be moved towards and away from the substrate of interest as will be explained below.

Generally horizontal rods 801, 801' are movably mounted to leg base mounts 812, 812'. As shown by the arrows in FIG. 7, these rods can move up or down on leg base mounts 812, 812'. Generally perpendicular upper legs 802, 802' are attached to horizontal rods 801, 801' as shown. Lower legs 803, 803' are attached to upper legs 802, 802' by universal joints 804, 804'. Thus, lower legs 803, 803' have a large range of motion with respect to upper legs 802, 802'. This arrangement permits suction cup assemblies 805, 805' a considerable amount of movement such that they can be aligned with uneven surfaces as shown.

Although not shown in FIG. 7, a horizontal rod 801'' is movably mounted on leg base mount 812''. A generally perpendicular upper leg 802'' [not shown in FIG. 7] is mounted to horizontal rod 801''. A lower leg 803'' [not shown in FIG. 7] is mounted to upper leg 802'' by a universal joint 804'' [not shown in FIG. 7]. This arrangement permits suction cup assembly 805'' [not shown in FIG. 7] a considerable amount of movement such that it can be aligned with uneven surfaces. It is noted that the suction cup assemblies 703', 703'' shown for device 700 in FIG. 1 are rather large bellows-type suction cup assemblies. The construction of the bellows-type suction cup itself permits attachment of the suction cup to rather uneven surfaces because of the flexibility of the bellows-type suction cup. Thus, if suction cup assemblies 805, 805' and 805'' are bellows-type suction cups, the very construction of the suction cup coupled with the flexible mounting means shown in FIG. 7 will permit attachment of device 800 to a wide range of non-planar surfaces.

Once the device 800 has been secured to substrate 810, heating means 900 can be adjusted as described above such that it is thermally sealed to substrate 810. This is achieved by moving heater mount 850 by means of hex adjustment screws 822, 822' such that the attached heating means 900 is biased towards surface 810. The heating means 900 is lowered towards substrate 810 until flexible heat shields 850', 851', 852' and 853' [heat shield 853' is not shown in FIG. 7] are deformed as shown in FIG. 7—thus sealing heating means 900 against surface 810. Heating coils 620, 620', 620'' etc. are energized and the portion of substrate 810 immediately under the heating unit 900 can be subjected to a controlled application of heat. The heat shields 850', 851', 852' and 853' permit the heat to be applied to a very controlled area such that portions of substrate 810 not directly underneath heating means 900 do not suffer significantly elevated temperature.

No timer or control means is shown for device 700 or for device 800 but it is noted that the art is replete with such control means which are small enough to be mounted on either device 700 or device 800. Either an open loop or closed loop type of heater control means could be utilized to control heating means 600 or 900. It is also possible to simply use an external timer in conjunction with a power on/off switch to control the heat application based upon calibration testing for the particular substrate being treated.

The above-described embodiments are merely illustrative of the principles of the invention. Those skilled in the art may make various modifications and changes, which will embody the principles of the invention and fall within the spirit and scope thereof.

The invention claimed is:

1. An apparatus permitting closely controlled heat application to a substrate of indefinite size, said apparatus comprising:
    a base plate having an upper surface and a lower surface;
    a heater mount having an upper and a lower surface with said upper surface of said heater mount being mounted to the lower surface of said base plate;
    a heating unit attached to the lower surface of said heater mount, with said heating unit further comprising a housing with a closed top and an open bottom and a heat source contained within said housing such that thermal energy from said heat source may escape said housing through said open bottom;
    a support device comprising securing means mounted to the upper surface of said base plate to removably and non-destructively secure said apparatus to one surface of a substrate of indefinite size;
    wherein said securing means further comprises at least two independently adjustable mounting means to adjust the distance between said heater means and one surface of a substrate of indefinite size in order to bias said heating unit towards the surface of a substrate of indefinite size;
    and, wherein said securing means further comprises a suction cup.

2. The apparatus of claim 1 wherein said securing means further comprises at least two elongated, threaded adjustment screws having an upper and a lower end mounted to said base plate by a detachable and adjustable mounting means with a securing means mounted on the lower end of each adjustment screw to enable the said apparatus to be releasably and non-destructively secured to one surface of a substrate of indefinite size; said detachable and adjustable mounting means further comprising, for each said adjustment screw, an adjustment screw mount movably carrying said adjustment screw, with each adjustment screw mount being removably attached to a cooperating leg base mount and with each said leg base mount being secured to said upper surface of said base plate.

3. The apparatus of claim 1 wherein each said adjustment screw mount has a proximal side and a distal side with each said adjustment screw being loosely received in a through-bore in said distal side of said adjustment screw mount, with said through-bore being interrupted by a transverse slot;
    a threaded adjustment nut rotatably mounted in said transverse slot in such manner that it can be manually rotated by an operator;
    each said adjustment screw being threaded through the adjustment nut mounted in said transverse slot wherein rotation of said adjustment nut in one direction causes each said adjustment screw to move up through said through-bore and wherein rotation of said adjustment screw in the other direction causes each said adjustment screw to move downwardly through said through-bore.

4. The apparatus of claim 2 wherein there are at least three elongated, threaded adjustment screws having an upper and a lower end mounted to said base plate by a detachable and adjustable mounting means.

5. The apparatus of claim 1 wherein said suction cup further comprises a bellows-type pneumatic suction cup.

6. The apparatus of claim 1 wherein said heating unit housing further comprises an inner wall and an outer wall with insulative material between said inner wall and said outer wall.

7. The apparatus of claim 6 wherein said heating unit housing is shaped to be generally rectangular in plan view and wherein flexible heat shields are attached to the housing outer wall at the open bottom end thereof to permit thermal isolation of the heating unit when said heating housing unit is biased onto a substrate of interest.

8. An apparatus permitting closely controlled heat application to a substrate of indefinite size, said apparatus comprising:
    a base plate having an upper surface and a lower surface;
    a heater mount having an upper and a lower surface with said upper surface of said heater mount being mounted to the lower surface of said base plate;
    a heating unit attached to the lower surface of said heater mount, with said heating unit further comprising a housing with a closed top and an open bottom and a heat source contained within said housing such that thermal energy from said heat source may escape said housing through said open bottom, said heating unit further comprising a heat source carried within said housing;
    said support device further comprising securing means mounted to the upper surface of said base plate to removably and non-destructively secure said apparatus to one surface of a substrate of indefinite size;
    said securing means further comprising adjustment means to adjust the distance between said heating unit and one surface of a substrate of indefinite size in order to bias said heating unit towards the surface of a substrate of indefinite size;
    wherein said securing means further comprises at least two independently adjustable mounting means to adjust the distance between said heater means and one surface of a substrate of indefinite size;
    and, wherein said securing means further comprises a suction cup.

9. The apparatus of claim 8 wherein there are at least three independently adjustable mounting means to adjust the distance between said heater means and one surface of a substrate of indefinite size.

10. The apparatus of claim 8 wherein said suction cup further comprises a bellows-type pneumatic suction cup.

11. The apparatus of claim 8 wherein said heating unit housing further comprises an inner wall and an outer wall with insulative material between said inner wall and said outer wall.

12. The apparatus of claim 11 wherein said heating unit housing is shaped to be generally rectangular in plan view and wherein flexible heat shields are attached to the housing outer wall at the open bottom end thereof to permit thermal isolation of the heating unit when said heating housing unit is biased onto a substrate of interest.

13. An apparatus permitting closely controlled heat application to a substrate of indefinite size, said apparatus comprising:
- a base plate having an upper surface and a lower surface;
- at least two leg base mounts secured to said upper surface of said base plate with each leg base mount having a proximal side and a distal side;
- a heater mount having an upper and a lower surface with said upper surface of said heater mount being mounted to the lower surface of said base plate;
- a heating unit attached to the lower surface of said heater mount, with said heating unit further comprising a housing with a closed top and an open bottom and a heat source contained within said housing such that thermal energy from said heat source may escape said housing through said open bottom, said heating unit further comprising a heat source carried within said housing;
- said support device further comprising securing means mounted to the upper surface of said base plate to removably and non-destructively secure said apparatus to one surface of a substrate of indefinite size;
- said securing means further comprising:
- an attachment arm mounted generally perpendicular to the distal side of each leg base mount;
- a leg mounted generally perpendicular to each said attachment arm, with said leg comprising first and second segments;
- means permitting said first segment of each leg to be moved in a first direction perpendicular to said attachment arm;
- said means also permitting said first segment to be moved in a second direction perpendicular to said attachment arm and is opposition to said first direction; and,
- joining means joining said first and second leg segments, said joining means further comprising a locking universal joint to permit the angle between said first and said second leg segments to be widely varied, and to lock said segments in position when said angle has been set.

14. The apparatus of claim 13 wherein said securing means further comprises suction cups mounted to said second leg segments at the end thereof opposite to said joining means.

15. The apparatus of claim 14 wherein said suction cups further comprises bellows-type pneumatic suction cups.

16. The apparatus of claim 13 wherein said heating unit housing further comprises an inner wall and an outer wall with insulative material between said inner wall and said outer wall.

17. The apparatus of claim 16 wherein said heating unit housing is shaped to be generally rectangular in plan view and wherein flexible heat shields are attached to the housing outer wall at the open bottom end thereof to permit thermal isolation of the heating unit when said heating housing unit is biased onto a substrate of interest.

* * * * *